(12) United States Patent
Strentzsch et al.

(10) Patent No.: US 6,256,671 B1
(45) Date of Patent: Jul. 3, 2001

(54) METHOD AND APPARATUS FOR PROVIDING NETWORK ACCESS CONTROL USING A DOMAIN NAME SYSTEM

(75) Inventors: Scott A. Strentzsch; Lewis T. Donzis, both of San Antonio, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/104,462

(22) Filed: Jun. 24, 1998

(51) Int. Cl.[7] .............................. G06F 15/16; G06F 12/14
(52) U.S. Cl. ................... 709/227; 709/229; 709/249; 713/201
(58) Field of Search ..................................... 709/225, 229, 709/238, 249, 224, 228, 227; 707/10; 370/401; 713/201, 202

(56) References Cited

U.S. PATENT DOCUMENTS

| | | | |
|---|---|---|---|
| 5,802,053 | * | 9/1998 | Bollella et al. ................. 370/401 |
| 5,805,820 | * | 9/1998 | Bellovin et al. ................ 709/225 |
| 5,815,665 | * | 9/1998 | Teper et al. .................... 709/229 |
| 5,855,020 | * | 12/1998 | Kirsch ............................. 707/10 |
| 5,867,665 | * | 2/1999 | Butman et al. ................. 709/238 |
| 5,898,830 | * | 4/1999 | Wesinger, Jr. et al. ......... 709/225 |
| 5,958,052 | * | 9/1999 | Bellovin et al. ................ 713/201 |
| 5,974,453 | * | 10/1999 | Andersen et al. .............. 709/228 |
| 5,978,568 | * | 11/1999 | Abraham et al. ............... 709/225 |
| 6,052,788 | * | 4/2000 | Wesinger, Jr. et al. ......... 713/201 |
| 6,061,346 | * | 5/2000 | Nordman . |
| 6,061,734 | * | 5/2000 | London .......................... 709/238 |
| 6,081,900 | * | 6/2000 | Subramaniam et al. ........ 713/201 |
| 6,134,588 | * | 10/2000 | Guenthner et al. ............. 709/226 |

OTHER PUBLICATIONS

Mockapetris, P., "Domain Names—Concepts and Facilities, Request for Comments:1034," Nov. 1987, 55 pages.
Mockapetris, P., "Domain Names—Implementation and Specification, Request for Comments:1035," Nov. 1987, 55 pages.

* cited by examiner

Primary Examiner—Robert B. Harrell
Assistant Examiner—Marc D. Thompson
(74) Attorney, Agent, or Firm—Blakely Sokoloff Taylor & Zafman LLP

(57) ABSTRACT

A method and apparatus for providing network access control by manipulating a domain name system includes receiving, from a source, a request for an address which corresponds to a host name. A check is made as to whether a requestor corresponding to the request is allowed to access a host system corresponding to the host name. If the requestor is not allowed to access the host system corresponding to the host name, then an indication is provided to the source of the request that the address which corresponds to the host name cannot be located.

25 Claims, 7 Drawing Sheets

| | | 414 | 418 422 |
|---|---|---|---|
| USER | ADDRESS | ACCESS | |
| JOE_SMITH | 206.210.192.1 | WWW.BAYNETWORKS.COM;NOT ALLOWED, 134.23.7.142;NOT ALLOWED | |
| GROUP (ALL) | | WWW.BAYNETWORKS.COM; NOT ALLOWED 116.9.182.12;NOT ALLOWED | |

METHOD AND APPARATUS FOR PROVIDING NETWORK ACCESS CONTROL USING A DOMAIN NAME SYSTEM

BACKGROUND OF THE INVENTION

1. Field of the Invention

The present invention pertains to network access management. More particularly, this invention relates to controlling access to a network by manipulating a domain name system.

2. Background

Computer systems are increasingly becoming commonplace in homes and businesses throughout the world. As the number of computer systems has increased, more and more computer systems are becoming interconnected via networks. These networks include local area networks (LANs), such as are commonly found in businesses and educational facilities throughout the world, as well as some homes. Computer systems coupled to a LAN are also frequently coupled to other computer systems, such as a wide area network (WAN) or via the Internet.

Communication between two computer systems coupled together via one or more networks is typically performed using a client-server relationship wherein a software application running on one system, referred to as the client, requests information from a server application running on another system. The client and server systems communicate with one another over the network to satisfy the client's request. The computer system running the server application often runs several server applications and is typically referred to as a "server host" or simply as "the host system".

One problem which arises in networked system is that of controlling access to the host systems. Network administrators frequently want to limit individuals' abilities to access various host systems. For example, a parent may want to prevent his or her children from accessing host systems storing content unsuitable for children. By way of another example, an employer may want to prevent employees from accessing particular host systems using the employer's equipment.

Typical access control programs perform access management at the client system. This can be a problem in that the data for inaccessible sites is also stored at the client system, and thus is more easily accessible to the client system users. Thus, it would be beneficial to provide a more secure way to control access to host systems on the network.

Additionally, typical access control programs indicate to the user that, due to the access management settings, the user is prevented from accessing the desired host system. This can be a problem in that it alerts the user to a particular site he or she is not supposed to access. Thus, it would be beneficial to provide a more subtle way to control access to host systems on the network.

Thus, a need exists for an improved way to control network accesses.

SUMMARY OF THE INVENTION

A method and apparatus for providing network access control by manipulating a domain name system is described herein. The method includes the steps of receiving, from a source, a request for an address which corresponds to a host name. A check is then made as to whether a requestor corresponding to the request is allowed to access a host system corresponding to the host name. If the requestor is not allowed to access the host system corresponding to the host name, then an indication is provided to the source of the request that the address which corresponds to the host name cannot be located.

According to one embodiment, the present invention also checks the address which corresponds to the host name, and then checks whether the requester is allowed to access the host system corresponding to the address. If the requester is not allowed to access the host system corresponding to the address, then an indication is provided to the source of the request that the address which corresponds to the identifier cannot be located.

BRIEF DESCRIPTION OF THE DRAWINGS

The present invention is illustrated by way of example and not limitation in the figures of the accompanying drawings, in which like references indicate similar elements and in which:

FIG. 4 is a block diagram illustrating an access management database according to one embodiment of the present invention;

DETAILED DESCRIPTION

Figure 1:
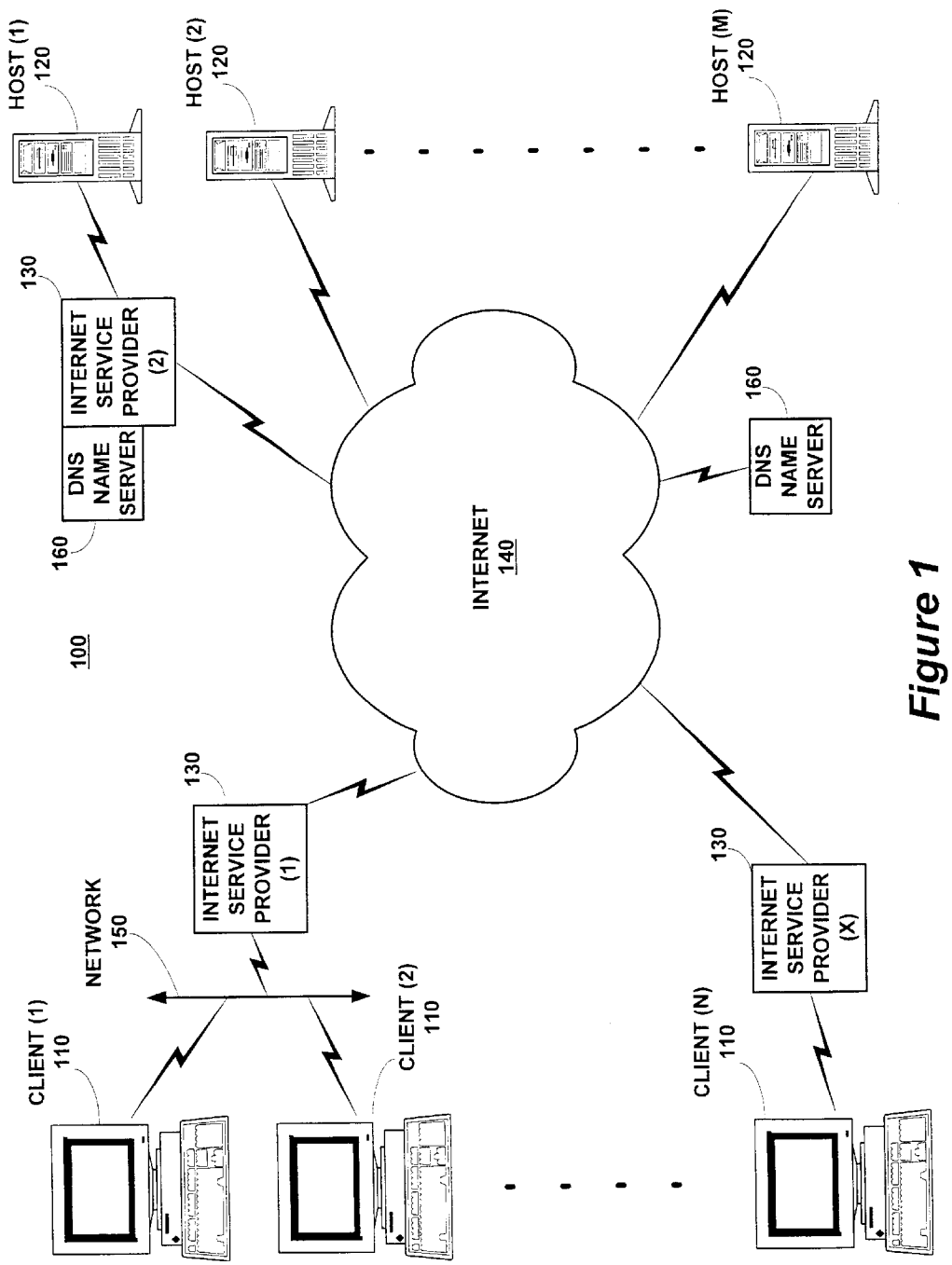
FIG. 1 is a block diagram illustrating a network environment in which the present invention may be practiced.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

In alternative embodiments, the present invention may be applicable to implementations of the invention in integrated circuits or chip sets, wireless implementations, switching systems products and transmission systems products. For purposes of this application, the terms switching,systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is a block diagram illustrating a network environment in which the present invention may be practiced. As illustrated, network environment 100 includes multiple (N) client systems 110 and multiple (M) host systems 120. Network environment 100 also includes multiple (X) internet service providers (ISPs) 130 and the Internet 140. Each client system 110 can be any of a wide range of computing devices which provide a user with the ability to access the internet 140. Examples of systems 110 include general purpose computers and Internet "appliance" devices, such as a WebTV™ internet Terminal available from Sony Electronics Inc. of Park Ridge, N.J. or Philips Consumer Electronics Company of Knoxville, Tenn.

As illustrated, each client system 110 can be either directly coupled to an ISP 130 or can be coupled to an ISP 130 via an additional network. For example, multiple client systems 110 may be coupled together in a local area network (LAN), illustrated as network 150, and access an ISP 130 via the LAN 150.

Each ISP 130 is typically a computer system having multiple communication lines for accessing both the client systems 110 and the Internet 140 and optionally having a large amount of storage space (typically on the order of hundreds of gigabytes or terabytes). Additionally, some ISPs 130 also cache data received from host systems 120. The data that is cached may be the result of an access initiated by a user of a client system 110, or may be the result of a self-initiated access by the ISP 130. If a request for access to a host system 120 is received by an ISP 130 and the ISP 130 has the requested data from the host system stored in its cache, then the ISP may directly return the requested data to the client system rather than forwarding the request to the targeted host system.

Each host system 120 is also typically a computer system which can be accessed by the client systems 110. The host systems 120 provide services to client systems 110 running software that takes advantage of, or otherwise uses, these services. According to one implementation, each host system 120 includes one or more HyperText Markup Language (HTML) compatible web pages which can be accessed via the HyperText Transfer Protocol (HTTP) and displayed by an HTML compatible Internet browser running on a client system 110. According to another implementation, each host system 120 includes one or more files which can be accessed via the File Transfer Protocol (FTP) by an FTP compatible Internet browser running on a client system 110.

The Internet 140 is a combination of multiple conventional hardware components, including computer systems, routers, repeaters, gateways, and communications links spread throughout the world. These hardware components are organized hierarchically to provide multiple logical levels of networks. The hardware components of Internet 140 interact to route data from one computer system to another. According to one implementation, data is transferred between computer systems using the well-known Transmission Control Protocol/Internet Protocol (TCP/IP) protocol. The data is typically transferred in units referred to as "packets". Typically, each packet includes data, a source address identifying the system which initiated the packet and a target address identifying the system to which the packet is to be sent. Additional control information, such as a checksum, may also be included in the packet. The number of bytes of data contained within a packet is dependent on the network protocol being used.

A client system 110 accesses a host system 120 by providing an Internet Protocol (IP) address of the host system 120. According to one implementation, the IP address is a 32 bit number in the format of four numbers separated by three periods, shown generically as "xxx.yyy.zzz.nnn". Each of the four numbers can range from 0 to 255. However, it is to be appreciated that other IP addressing formats can be used as well.

A domain name system (DNS) has been developed which maps particular host names to IP addresses, allowing users to identify host systems in a more user-friendly manner. These host names are typically in the form of two or three words or phrases separated by periods and are much easier for individuals to use. Examples of such host names include "www.baynetworks.com" and "www.uspto.gov". Although communication between client and host systems over the Internet uses the IP addresses, users can interface with their network software applications, such as Internet browsers, using the host names.

During operation, a user of a client system 110 inputs a uniform resource locator (URL) containing a host name to the Internet browser at the client system. In order to access the host system 120 targeted by the URL, the browser attempts to identify the IP address mapped to the host name embedded in the URL. The browser extracts the host name from the URL in a conventional manner and sends a DNS query to a DNS server 160 via the ISP 130 requesting the IP addresses for the host name. It is to be appreciated that there may be many IP addresses assigned for a single host name. An additional DNS proxy may also be situated between the client systems 110 and ISPs 130, as discussed in more detail below. Each DNS server 160 stores a mapping of host names to IP addresses. When a DNS server 160 receives a DNS query, it searches for a mapping and, if found, responds with the corresponding address(es). If not found, it forwards the query to an additional DNS name server(s) 160. Note that, given the infinite number of host names, no one DNS server 160 stores all mappings.

When a DNS name server 160 which is aware of the IP address for the queried host name returns the IP address to the Internet browser, the browser is then able to access the host system targeted by the URL. However, if none of the accessed DNS name servers 160 are aware of the IP address for the queried host name, then a "name error" message is returned to the browser indicating that the requested host name could not be located.

The communication links illustrated in FIG. 1 may be any of a wide range of conventional communication media, and may be different for different systems 110, host systems 120, and ISPs 130. For example, a communication link may be a cable, a fiber-optic cable, or may represent a nonphysical medium transmitting electromagnetic signals in the electromagnetic spectrum. Additionally, a communication link may also include any number of conventional routing or repeating devices, such as satellites or electromagnetic signal repeaters.

It is to be appreciated that although the client systems 110 and host systems 120 are illustrated as being different machines, a single hardware system may be both a client system and a host system. If the hardware system is initiating an access for information to another system then the hardware system is referred to as a client system. However, if the hardware system is being accessed by another system to obtain information from the hardware system then the hardware system is referred to as a host system.

Figure 2:
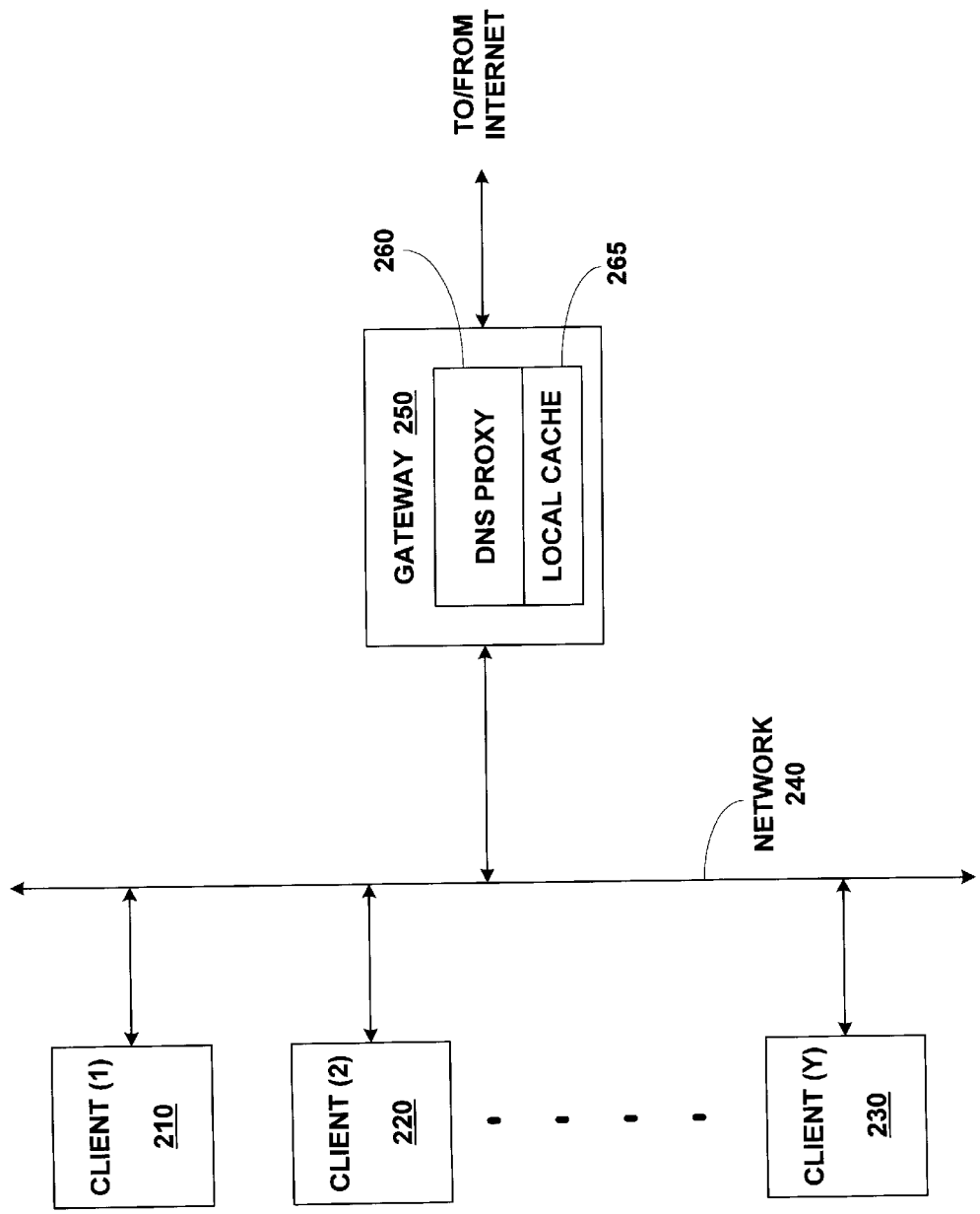
FIG. 2 is a block diagram illustrating a network system in which one embodiment of the present invention is practiced.

FIG. 2 is a block diagram illustrating a network system in which one embodiment of the present invention is practiced. In the network system 200 multiple (Y) client systems 210, 220, and 230 are coupled to a network 240. In the illustrated embodiment network 240 is a local area network (LAN) of any of a wide variety of physical types, such as an Ethernet or Token Ring network. Network 240 supports and conforms to a wide variety of conventional networking protocols and environments, such as Windows networking (used by Windows 95™, Windows NT™, as well as other systems), or Novell Netware networking protocols.

The network system 200 also includes a gateway 250. The gateway 250 provides an interface between the network 240 and the Internet. Requests from one of the client systems 210, 220 and 230 are received by the gateway 250 in accordance with the protocol of the network 240. The gateway 250 then forwards the requests to the Internet, either directly or via an ISP, making any necessary conversions so that the requests conform to the proper protocol (e.g., the HTTP or FTP protocols). Similarly, data from another system on the Internet which targets one of the client systems 210, 220 or 230 is received by the gateway 250 and forwarded to the appropriate client system 210, 220 or 230 using the protocol of the network 240. In one implementation, the gateway 250 is an Instant Internet ™ device available from Bay Networks Inc. of Santa Clara, Calif.

The gateway 250 may also include a DNS proxy 260. The DNS proxy 260 manages DNS queries from Internet browsers executing on client systems 210, 220, and 230. As used herein, the client system originating a DNS query is referred to as the source of that DNS query. The DNS proxy 260 includes a local cache 265 for temporarily storing address to identifier mappings. In the illustrated embodiment, the addresses are IP address and the identifiers are host names. The DNS proxy 260 operates as a reduced-feature DNS name server. The DNS proxy maintains a smaller local memory (cache 265) and does not provide long-term storage of host name to IP address mappings. Additionally, the DNS proxy 260 does not maintain a record of "authority" information for any host name to IP address mappings. Thus, if an authority for a particular host name to IP address mapping is required, DNS proxy 260 obtains it from an authority DNS name server on the Internet. The local cache 265 is typically on the order of 100 Kbytes to 16 Megabytes of storage space as opposed to the larger storage spaces, on the order of hundreds of megabytes or gigabytes, used by the DNS name servers. In alternate embodiments, the DNS proxy 260 can be a fully functional DNS name server, including permanent mapping tables and authority information.

Upon receipt of a DNS query from a network application over the network 240, the DNS proxy 260 checks its local cache 265 to determine whether it has cached the requested IP address to host name mapping. If the local cache 265 includes the requested IP address to host name mapping, then the IP address is returned to the source of the DNS query, and thus the network application, subject to the access management controls discussed below.

However, if the local cache 265 does not have the requested IP address to host name mapping, then the DNS query is forwarded by the DNS proxy 260 to one or more other DNS name servers on the Internet. In accordance with the DNS protocol, the query may be forwarded to various other DNS name servers on the Internet until a DNS name server which stores the appropriate IP address to host name mapping is accessed. The DNS name server which stores the mapping then sends a message via the Internet to the DNS proxy 260 identifying the IP address. The DNS proxy 260 in turn forwards the IP address to the requesting Internet browser, subject to the access management controls discussed below. In one embodiment, the DNS proxy 260 also stores the IP address to host name mapping in its temporary local cache 265. The use of the DNS protocol and the DNS name servers distributed across the Internet is well-known to those skilled in the art and thus will not be discussed further except as it pertains to the present invention.

According to one embodiment of the present invention, the DNS proxy 260 acts as a "resolver" for DNS queries. The DNS proxy 260 sends out DNS queries of its own over the Internet to one or more DNS name servers. As is known to those skilled in the art, a DNS name server may return a "referral" to another DNS name server rather than an actual IP address. In such situations, the DNS proxy 260 subsequently issues an additional DNS query to the DNS name server to which it is referred. This referral process continues until either an IP address is received, no more referrals are received, or the proxy 260 times out. Typical "time out" values range from one or two seconds to twenty or thirty seconds, although alternate embodiments can use different values. Additionally, it should also be noted that most DNS name servers are "recursive". A recursive DNS name server takes over responsibility for locating the IP address once the DNS query is received. Thus, a recursive DNS name server accessed by the DNS proxy 260 will subsequently access the "referred to" DNS name servers rather than the DNS proxy 260.

Figure 3:
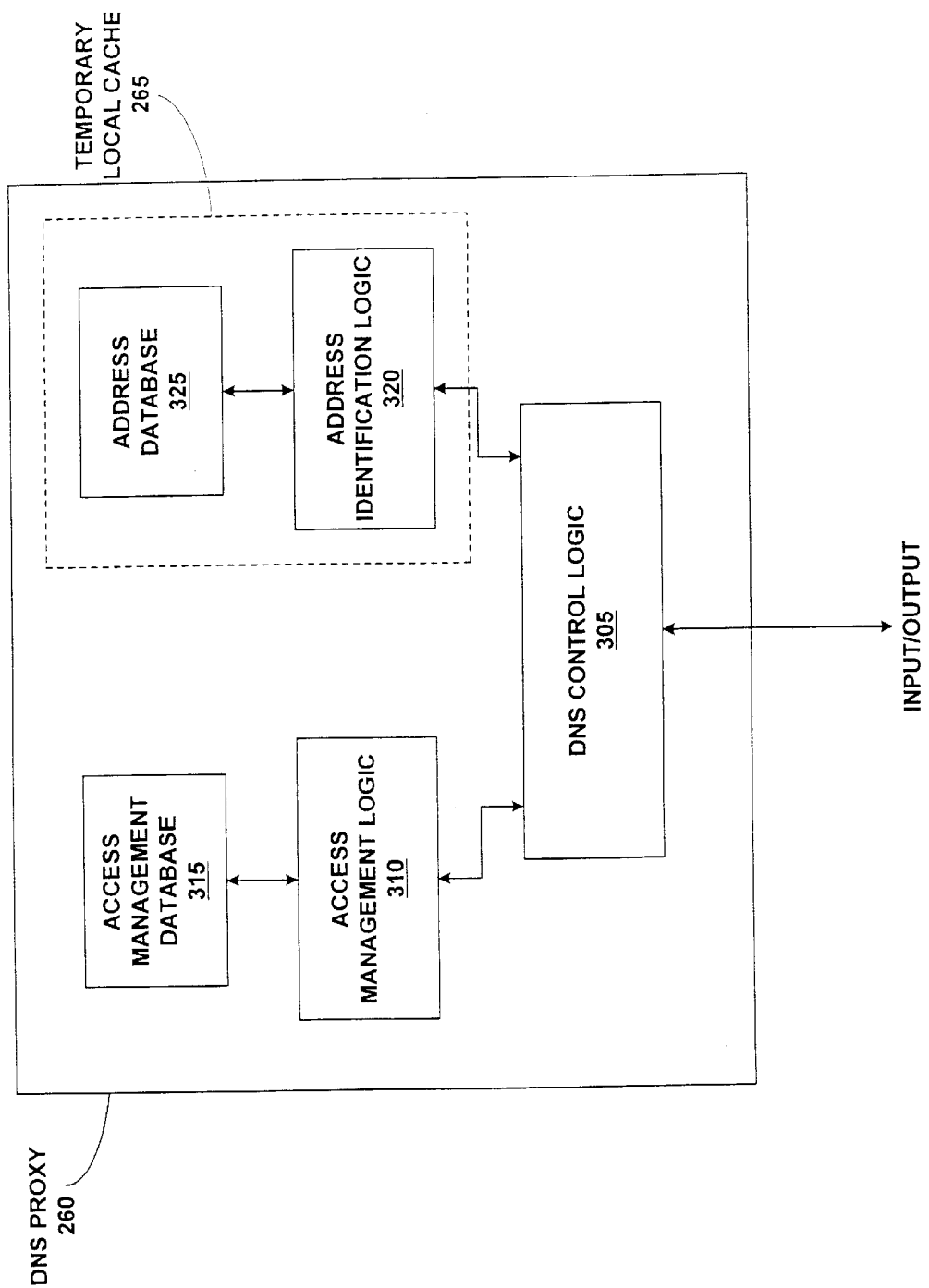
FIG. 3 is a block diagram illustrating a DNS proxy in more detail according to one embodiment of the present invention.

FIG. 3 is a block diagram illustrating a DNS proxy in more detail according to one embodiment of the present invention. As illustrated, the DNS proxy 260 includes DNS control logic 305, access management logic 310, and access management database 315. Additionally, DNS proxy 260 includes the local cache 265, including address identification logic 320 and address database 325.

DNS queries received by the gateway 250 of FIG. 2 are handled by the DNS proxy 260. Upon receipt of a DNS query, DNS control logic 305 forwards the received host name as well as an indicator of the requestor to access management logic 310 to check whether the requestor is allowed to access the host name. DNS control logic 305 also forwards the received host name to address identification logic 320 to check whether the local cache 265 stores the host name to 1P address mapping. It is to be appreciated that access management logic 310 and address identification logic 320 can perform their respective-functions concurrently, or one subsequent to the other.

Access management logic 310 checks the access management database 315 to determine whether the requestor is allowed to access the host system identified by the received host name. As discussed in more detail below, a "requester" can be either a particular user or a particular client system. Based on this checking, the access management logic 310 returns an indication to the DNS control logic 305 whether the requestor is allowed to access the host system identified by the received host name. In the illustrated embodiment, access management database 315 maintains a record of those sites which a requestor is restricted from accessing. In alternate embodiments, access management database 315 maintains a record of only those host systems which are accessible; any host system not in the record is not accessible to the user. These accessible systems can be in place of or alternatively in addition to the restrictions.

Most DNS queries will result in a successful mapping to an IP address. Upon receipt of such an IP address, whether it be from address identification logic 320 or another DNS name server, DNS control logic forwards the IP address to the access management logic 310. The access management logic 310 then checks whether the requester is allowed to access the host system identified by the received IP address.

FIG. 4 is a block diagram illustrating an access management database according to one embodiment of the present invention. In the embodiment of FIG. 4, access management database 315 is implemented as a table 400. As illustrated, table 400 includes a user identification section 406, an address identification section 408, and an access section 410. In the embodiment of FIG. 4, the requestor information is separated into two sections: a "user" section and "address" section. The user identification section 406 indicates particular users from which DNS queries may be received by the DNS proxy 260 of FIG. 2. The users may be listed individually or in groups of one or more individuals. The address identification section 408 indicates particular client system addresses from which DNS queries may be received by the DNS proxy 260. The addresses may be listed individually or in groups of one or more individuals.

A requestor can be a particular client system, such as client system 220 of FIG. 2, without regard for the user of the client system. According to one embodiment, address identification section 408 indicates the network addresses of the particular client system requestors. The network address of a particular client system making a DNS query is provided to the DNS proxy 260 as part of the DNS query.

Additionally, a requester can be a particular user without regard for which client system is being used. According to one embodiment, user identification section 406 indicates the user identifications of the various users of the network 240. The exact format of these user identifications is dependent on the naming conventions of the networking software used on the LAN. The user identification of a particular client system making a DNS query can be obtained by the DNS proxy 260 in any of a wide variety of manners, and may be dependent in part on the protocol being used by the network 240. According to one implementation, the user identification is provided to the DNS proxy 260 as part of the DNS query. In another implementation, DNS proxy 260 maintains a static mapping (not shown) of specific client system addresses to users, with the client system providing its address as part of the DNS query. In another implementation, DNS proxy 260, in response to a DNS query, obtains the user identification by sending a request to the client system issuing the DNS query as to the identification of the user currently logged into the client system. An application (not shown) on the client system then forwards the user identification to the DNS proxy 260.

The access section 410 provides a list of host names and/or IP addresses for each requestor indicated in user identification section 406 or address identification section 408. Additionally, an indication is provided as to whether the requester is allowed access to the host names and/or IP addresses. According to the illustrated implementation, either "allowed" or "not allowed" follows each host name and IP address to provide this indication.

Three sample entries in the table 400 are illustrated in FIG. 4. The first is for a particular user, Joe Smith 412, the second is for a particular network address, address "206.210.192.1" 416, and the third is for a particular group, all 420. As illustrated by restriction 414, the user with the identification Joe_Smith is not allowed to access the host system with the host name of www.baynetworks.com or the IP address of 134.23.7.142. This restriction 414 is tied to the particular user with the identification of Joe_Smith without regard for what client system that user may be using. Similarly, restriction 418 indicates that the client system with the network address of "206.210.192.1" is not allowed to access the host system with the host name of www-.baynetworks.com. This restriction 418 is tied to the particular client system without regard for what user is using the client system or logged onto the network 240 via that client system. Similarly, restriction 422 indicates that the group of all users on the network 240 are not allowed to access the host system with the IP address of 116.9.182.12. This restriction 422 applies to all requests from the network 240 regardless of which user or which client system originated the request.

The data for restriction section 410 can be stored in table 400 by access management logic 310 of FIG. 3 in any of a wide variety of conventional manners. According to one embodiment, an additional application (not shown) executing on a client system 210, 220, or 230, or alternatively on gateway 250, provides an administrative user with access to table 410. The user can be presented with, for example, a graphical user interface (GUI) to allow the user to add, modify, and delete restrictions. The user is able to insert particular IP addresses or host names, or select from a predefined list, restricted IP addresses or host names for particular requestors or groups or requesters. Alternatively, IP addresses or host names could be automatically inserted to table 410 for particular requestors or groups of requestors by access management logic 310. Restriction information for such automatic insertion could be obtained, for example, from various host systems on the Internet or additional storage media (e.g., diskettes) which can be obtained by the user.

According to one embodiment of the present invention, host names and IP addresses in access section 410 may include "wildcards" (patterns matching one or more entities). The use of wildcards allows ranges of host systems to be included or excluded from access. By way of example, an asterisk (*) can be used to indicate multiple characters and a question mark (?) can be used to indicate a single character. Thus, for example, "*.baynetwork*.*" could be one restriction, while "134.23.7.1?2" could be another restriction.

Additional restrictions can also be imposed according to alternate embodiments of the present invention. By way of example, timing restrictions can be implemented in access management database 315 to restrict access on a per time period basis.

For ease of explanation, access management database 315 has been illustrated as a table in FIG. 4. However, it is to be appreciated that the data structure(s) used to maintain the information of database 315 may vary. For example, separate cross-referenced lists for the user identifications, address identifications, and access information can be maintained. Alternate embodiments can use any of a wide variety of conventional data structures to maintain the information of database 315.

Returning to FIG. 3, the address identification logic 320 checks whether a host name received from the DNS control logic 305 is stored in the address database 325. The address identification logic 320 compares the received host name to each of the host names stored in the address database 325. If a match is found, then the corresponding IP address (that is, the IP address that maps to the host name) is returned to the DNS control logic 305. If a match is not found, then a "not found" indication is returned to the DNS control logic 305.

If the address identification logic 320 indicates that a match is not found, then the DNS control logic 305 forwards the DNS query to a DNS name server coupled to the Internet. According to one embodiment, the DNS control logic 305 includes a predetermined IP address of a particular DNS name server to which DNS queries are to be sent.

Typically, most DNS queries result in the successful identification of a corresponding IP address. As discussed above, this IP address, regardless of its source, is provided to the access management logic 310 to check whether the user is allowed to access the identified host system. If the user is allowed to access the identified host system, then the IP address is returned to the Internet browserHowever, However, if the user is not allowed to access the identified host system, regardless of whether the access is denied based on a restriction identifying a host name or a restriction identifying a particular IP address, then the DNS control logic returns a "name error" message to the network application that originated the request. The "name error" message indicates to the network application that originated the request that the address that corresponds to the host name cannot be resolved (i.e., the address cannot be located by the DNS name server(s)). A received IP address, if any, is either stored in local cache 265 by the DNS control logic 305, or alternatively is simply discarded.

According to one alternate embodiment of the present invention, specific user identifications and/or client systems are not tracked. Rather, the entire network has restricted accessibility to particular host systems (e.g., corresponding to identifying the group all 420 above). In this alternate embodiment, the DNS control logic 305 need not concern itself with the identity of the requestor, as all requesters are treated equally.

In another alternate embodiment of the present invention, requester access is limited by a rating system rather than the identification of specific host systems. In this alternate embodiment, a host system rating is compared to a rating-access level allowed to the requester. If a host system is not within the rating-access level of the requester then the requestor is not allowed to access the host system. The host system ratings can be received from any of a wide variety of sources, such as being pre-programmed into the access management database 315 or alternatively received from the host systems themselves.

According to one embodiment of the present invention, the DNS control logic 305, the access management logic 310, and the address identification logic 320 are implemented in software. In this embodiment, software instructions to carry out the processes of logics 305, 310, and 320 are stored in a system memory (not shown) of the gateway 250 of FIG. 2 and executed by a processor (not shown) of the gateway 250. According to one alternate embodiment of the present invention, the logics 305, 310, and 320 are implemented in firmware (not shown), such as a ROM or Flash memory of the gateway 250. According to another alternate embodiment of the present invention, the logics 305, 310, and 320 are implemented in hardware (not shown), such as an application specific integrated circuit (ASIC) of the gateway 250.

Figure 5:
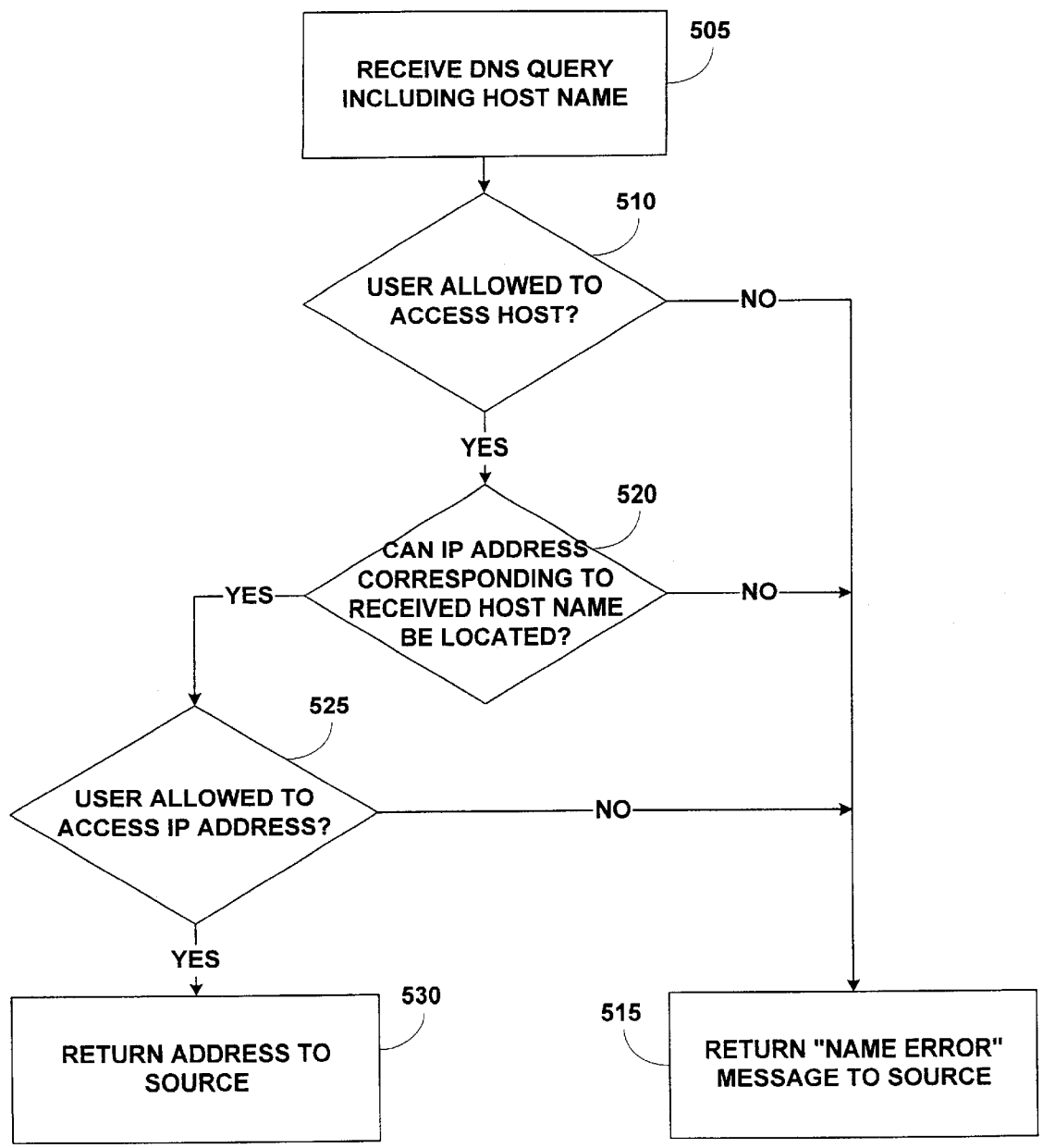
FIG. 5 is a flowchart illustrating the steps followed in carrying out the access management of the present invention.

FIG. 5 is a flowchart illustrating the steps followed in carrying out the access management of the present invention. According to one embodiment of the present invention, the steps of FIG. 5 are carried out by the DNS control logic 305, the access management logic 310, and the address identification logic 320 of FIG. 3. However, in alternate embodiments the present invention can be implemented in any one or more of the DNS name server(s) on the Internet.

The DNS control logic receives a DNS query, including a host name, step 505. The host name is forwarded to the access management logic which checks whether the requestor is allowed to access the host system corresponding to the host name, step 510. These restrictions for access control can be individual-specific, client system-specific, or group-specific, as discussed above. If the requestor is not allowed to access the host system corresponding to the host name then the DNS control logic returns a "name error" message to the source of the DNS query, step 515.

However, if the user is allowed to access the host name, then the DNS control logic checks whether an IP address corresponding to the received host name can be located, step 520. As discussed above, this locating may be performed locally by the address identification logic, or alternatively may be performed by a DNS name server coupled to the Internet. If no corresponding IP address can be located, then the DNS control logic returns a "name error" message to the source, step 515.

If, however, an IP address corresponding to the received host name can be located, then the DNS control logic forwards the IP address to the access management logic to check whether the user is allowed to access the IP address, step 525. If the user is not allowed to access the IP address, then the DNS control logic returns a "name error" message to the source, step 515. However, if the user is allowed to access the IP address, then the DNS control logic returns the IP address to the source, step 530.

In the embodiment illustrated in FIG. 5, the DNS control logic checks both host names and IP addresses against user restrictions to determine whether access to the desired host system is allowed. In one alternate embodiment, only host names are checked and IP addresses are not checked. In another alternate embodiment, only IP addresses are checked and host names are not checked.

Figure 6:
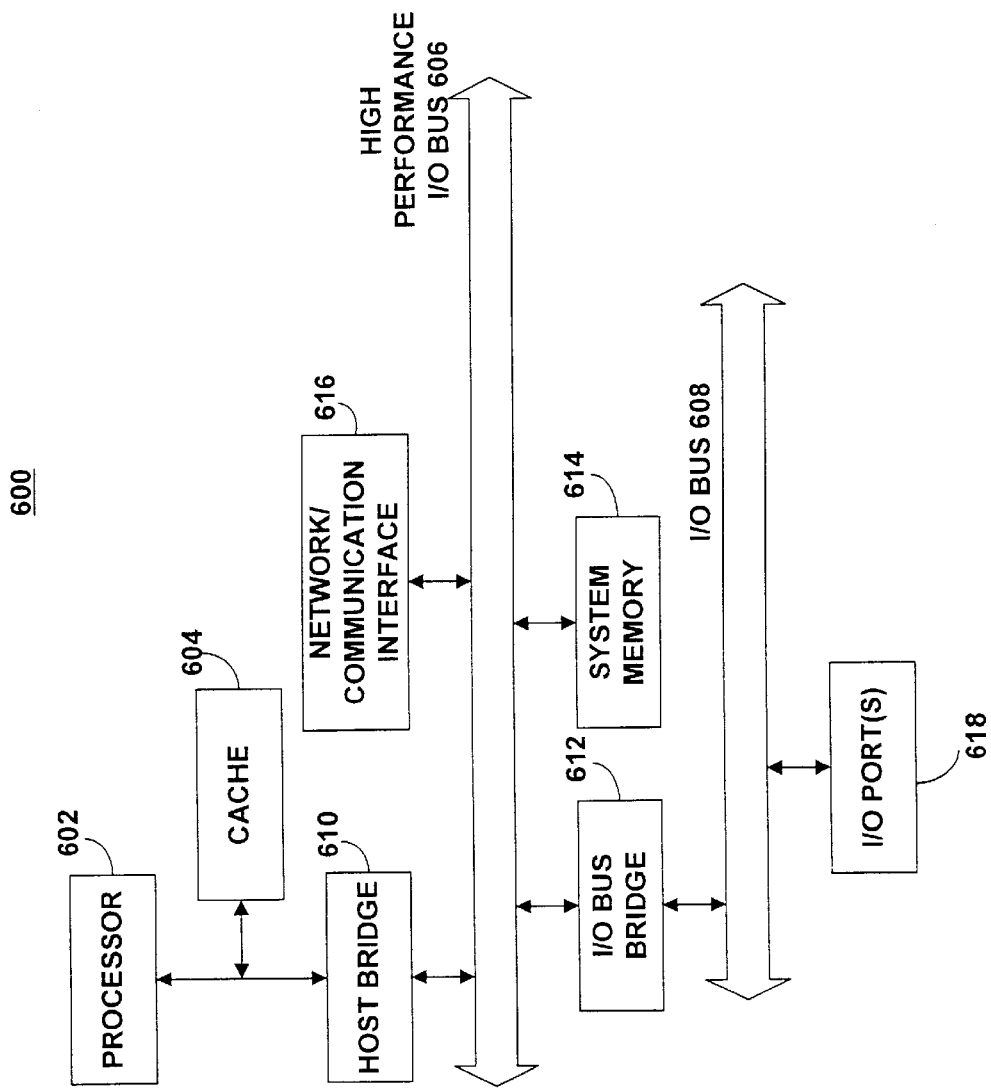
FIG. 6 illustrates a hardware system or machine on which one embodiment of the present invention can be practiced.

FIG. 6 illustrates a hardware system or machine on which one embodiment of the present invention can be practiced. In one embodiment, the gateway 250 illustrated in FIG. 2 is a hardware system 600 of FIG. 6. In the illustrated embodiment, hardware system 600 includes processor 602 and cache memory 604 coupled to each other as shown. Additionally, hardware system 600 includes high performance input/output (I/O) bus 606 and standard I/O bus 608. Host bridge 610 couples processor 602 to high performance I/O bus 606, whereas 110 bus bridge 612 couples the two buses 606 and 608 to each other. Network/communication interface 616 and system memory 614 are coupled to high performance 110 bus 606, and additional I/O ports 618 are coupled to 110 bus 608. 110 ports 626 are one or more serial and/or parallel communication ports used to provide communication between additional peripheral devices which may be coupled to hardware system 600. Collectively, these elements are intended to represent a broad category of hardware systems, including but not limited to the Instant Internet™ device available from Bay Networks of Santa Clara, Calif., or general purpose computer systems based on processors available from Intel Corporation of Santa Clara, Calif., from Advance Micro Devices (AMD) of Sunnyvale, Calif., from National Semiconductor of Sunnyvale, Calif., or from Digital Equipment Corporation (DEC) of Maynard, Mass.

These elements 602–618 perform their conventional functions known in the art. In particular, network/communication interface 616 is used to provide communication between system 600 and any of a wide range of conventional networks, such as an Ethernet, token ring, the Internet, etc. It is to be appreciated that the circuitry of interface 616 is dependent on the type of network the system 600 is being coupled to. In one implementation, hardware system 600 is coupled to network 240 of FIG. 2 via network/communication interface 616. One or more additional network/communication interfaces (not shown) may also be coupled to high performance I/O bus 606 or standard I/O bus 608 for communicating with another network, such as the Internet.

According to one embodiment of the present invention, a nonvolatile memory (not shown), such as a ROM or Flash memory, is also coupled to I/O bus 606 or I/O bus 608 to provide permanent storage for data and programming instructions to perform the above described functions of access management control and IP address identification of FIGS. 3 and 5, whereas system memory 614 is used to provide temporary storage for the data and programming instructions when executed by processor 602. According to an alternate embodiment of the present invention, a nonvolatile memory (not shown), such as a ROM or Flash memory, is also coupled to I/O bus 606 or I/O bus 608 to provide permanent storage for data and programming instructions which enable the hardware system 600 to receive additional data and programming instructions from another network device (such as a client system 210, 220, or 230 of FIG. 2) via interface 616 and store the data and instructions in the system memory 614. In this alternate embodiment, these additional data and programming instructions are used by processor 602 to perform the above described functions of access management control and IP address identification of FIGS. 3 and 5.

It is to be appreciated that various components of hardware system 600 may be re-arranged. For example, cache 604 may be on-chip with processor 602. Alternatively, cache 604 and processor 602 may be packaged together as a "processor module" and attached to a "processor card", with processor 602 being referred to as the "processor core". Furthermore, certain implementations of the present invention may not require nor include all of the above components. For example, cache 604 or I/O ports 618 may not be included in system 600. Additionally, the peripheral devices shown coupled to standard I/O bus 608 may be coupled to high performance I/O bus 606; in addition, in some implementations only a single bus may exist with the components of hardware system 600 being coupled to the single bus. Furthermore, additional components may be included in system 600, such as additional processors, mass storage devices, memories, video memories, display devices, keyboard devices, pointing devices, etc.

In alternate embodiments of the present invention, hardware system 600 is less complex than illustrated. By way of example, processor 602, system memory 614, and network/communication interface 624 could be implemented in a microcontroller or an application specific integrated circuit (ASIC).

In one embodiment, the method of FIG. 5 is implemented as a series of software routines run by hardware system 600 of FIG. 6. These software routines comprise a plurality or series of instructions to be executed by a processor in a hardware system, such as processor 602 of FIG. 6. Initially, the series of instructions are stored on a storage device, such as a read only memory (not shown). It is to be appreciated that the series of instructions can be stored on any conventional storage medium, such as a hard disk, removable diskette, CD-ROM, magnetic tape, DVD, laser disk, etc. It is also to be appreciated that the series of instructions need not be stored locally, and could be received from a remote storage device, such as a server on a network, via network/communication interface 616.

The instructions are copied from the storage device (or remote source) into memory 614 and then accessed and executed by processor 602. In one implementation, these software routines are written in the C++ programming language. It is to be appreciated, however, that these routines may be implemented in any of a wide variety of programming languages.

In alternate embodiments, the present invention is implemented in discrete hardware or firmware. For example, in one alternate embodiment, an application specific integrated circuit (ASIC) is programmed with the above described functions of the present invention.

Figure 7:
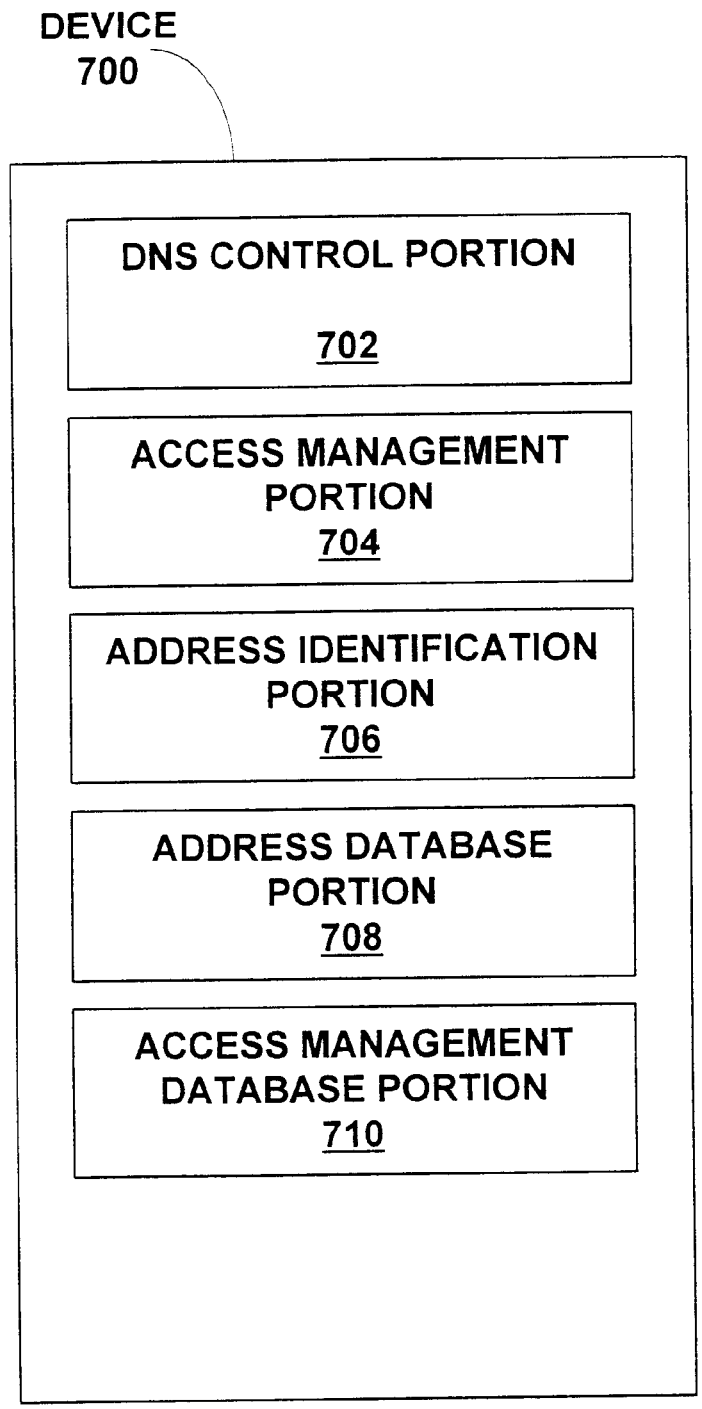
FIG. 7 is a block diagram illustrating a device on which one embodiment of the present invention is implemented.

FIG. 7 is a block diagram illustrating a device on which one embodiment of the present invention is implemented. The device 700 is meant to represent a wide variety of machine-readable media in which the present invention can be implemented, including conventional storage devices (such as a floppy disk, random access memory, or Flash memory), as well as discrete hardware or firmware.

The device 700 includes a DNS control portion 702, an access management portion 704, an address identification portion 706, an address database portion 708, and an access management database portion 710. Address database portion 708 includes the data for the IP address to host name mappings, whereas access management database portion 710 includes the data for the requestor and corresponding access information.

In embodiments where the present invention is implemented in software or firmware, DNS control portion 702 includes the instructions, to be executed by a processor, for carrying out the DNS control functions of logic 305 of FIG. 3. Similarly, access management portion 704 includes the instructions, to be executed by a processor, for carrying out the access management functions of logic 310 of FIG. 3, while address identification portion 706 includes the instructions, to be executed by a processor, for carrying out the address identification functions of logic 320 of FIG. 3.

In embodiments where the present invention is implemented in hardware, DNS control portion 702 includes the logic for carrying out the DNS control functions of logic 305 of FIG. 3. Similarly, access management portion 704 includes the logic for carrying out the access management functions of logic 310 of FIG. 3, while address identification portion 706 includes the logic for carrying out the address identification functions of logic 320 of FIG. 3.

Thus, the present invention advantageously prevents a particular requestor from obtaining the address of restricted host systems. Communication over networks, such as the Internet, depends upon being able to identify systems based on their addresses, such as their IP addresses. Therefore, preventing the user from obtaining the addresses of particular host system(s) effectively prevents the user from accessing those particular host system(s). Additionally, the access management system advantageously provides increased security by being located other than at the client systems. Furthermore, the present invention advantageously provides a "name error" message to the client system requesting the address. Such name errors typically result in a "site not found" or similar error message being displayed to the user. Thus, the user is not aware that the access management features of the present invention have prevented him or her from accessing the host system. Rather, the user is simply informed that a host system corresponding to the entered identifier, such as an URL, could not be located.

In the discussions above, the present invention is described as accessing the Internet using host names and IP addresses. It is to be appreciated, however, that the present invention can be used with any of a wide range of networks and is not limited to use with the Internet. Similarly, the present invention can be used with any of a wide range of identification schemes and is not limited to use with host names and IP addresses. The present invention can also be used with other networks and other identification schemes which provide a similar domain name system in which identifiers and corresponding addresses are used to identify particular client or host systems in the network.

In the discussions above, reference is made to particular components or apparatus being coupled together. As used herein, coupled is meant to include both a direct connection as well as an indirect connection. By way of example, additional apparatus and media can be situated between two components which are coupled together.

Also in the discussions above, the present invention is described as being implemented in a DNS proxy coupled between a network and an Internet. In alternate embodiments the present invention can be implemented in any one or more DNS name servers coupled to the Internet.

In the discussions above, the Internet browser is discussed as initiating a DNS query. However, in alternate embodiments any of a wide range of applications can initiate a DNS query. By way of example, the administrative tool discussed above which provides an administrative user with access to table 410 of FIG. 4 may also have the ability to initiate DNS queries, thereby enabling an administrative user to obtain IP addresses for host systems entered by the administrative user.

Thus, a method and apparatus for providing network access control using a domain name system has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method to manage access to external hosts by a gateway within a first network comprising:

receiving from a source within the first network, a request for an address which corresponds to a host having a host name;

checking whether the source is allowed to access the host corresponding to the host name; and if the source is not allowed to access the host corresponding to the host name, then the gateway concealing such lack of privilege from the source by providing an indication to the source that the address which corresponds to the host name cannot be located.

2. The method of claim 1, further comprising:

if the source is allowed to access the host corresponding to the host name, then providing the address to the source.

3. The method of claim 1, wherein the receiving comprises receiving a request for an internet protocol (IP) address outside the first network which corresponds to the host name.

4. The method of claim 1, wherein the receiving comprises receiving a request for the address which corresponds to a host name embedded in a uniform resource locator (URL).

5. The method of claim 1, wherein the source comprises a user of the source and the checking comprises uniquely identifying the user of the source.

6. The method of claim 1, wherein the checking comprises uniquely identifying the source from a plurality of potential sources.

7. An apparatus within a first network to manage access to external hosts comprising:

a control logic to receive, from a source within the first network, a request for a host address outside the first network which corresponds to a host having a host name;

an access management logic, coupled to the control logic, to check whether the source is allowed to access the host corresponding to the host name; and wherein the control logic is to provide an indication to the source that the address which corresponds to the host name cannot be located if the source is not entitled to access the host corresponding to the host name.

8. The apparatus of claim 7, wherein the control logic is further to provide the address to the source if the source is allowed to access the host corresponding to the host name.

9. The apparatus of claim 7, wherein the apparatus comprises a domain name server (DNS) within the first network.

10. The apparatus of claim 7, wherein the address comprises an internet protocol (IP) address outside the first network.

11. The apparatus of claim 7, wherein the host name is embedded in a uniform resource locator (URL).

12. The apparatus of claim 7, further comprising:

an access management database which stores a plurality of source indicators and corresponding access information.

13. The apparatus of claim 12, wherein the access information comprises a plurality of host names which are inaccessible by the source.

14. A machine-readable medium having stored thereon a plurality of instructions for managing access to external hosts by a gateway within a first network, which when executed by a processor, causes the processor to perform operations comprising:

receiving from a source within the first network a request for a host address outside the first network which corresponds to a host having a host name;

checking whether the source is allowed to access the host corresponding to the host name; and if the source is not allowed to access the host corresponding to the host name, then concealing such lack of privilege from the source by providing an indication to the source that the address which corresponds to the host name cannot be located.

15. The machine-readable medium of claim 14, wherein the plurality of instructions further provide the host address to the source, if the source is allowed to access the host.

16. The machine-readable medium of claim 14, wherein the source comprises a user of the source and wherein the checking comprises a plurality of instructions for implementing a function for uniquely identifying the user of the source.

17. The machine-readable medium of claim 14, wherein the checking comprises a plurality of instructions for implementing a function for uniquely identifying the source from a plurality of potential sources.

18. An apparatus within a first network to manage access to external hosts comprising:

means for receiving from a source within the first network a request for an address outside the first network which corresponds to a host having a host name;

means for checking, coupled to the means for receiving, whether the source is allowed to access the host corresponding to the host name; and means for providing, coupled to the means for checking, an indication to the source of the request that the address which corresponds to the host name cannot be located if the source is not allowed to access the host corresponding to the host name.

19. The apparatus of claim 18, further comprising:

means for providing the address to the source if the source is allowed to access the host corresponding to the host name.

20. The apparatus of claim 18, wherein the source comprises a user of the source, and the means for checking comprises means for uniquely identifying the user of the source.

21. The apparatus of claim 18, wherein the means for checking comprises means for uniquely identifying the source from a plurality of potential sources.

22. A method to manage access to external hosts by a gateway within a first network comprising:

receiving from a source within the first network, a request for a host address which corresponds to a host having a host name;

checking whether the source is allowed to access a host corresponding to the host address; and if the source is not allowed to access the host corresponding to the host address, then the gateway concealing such lack of privilege from the source by providing an indication to the source that the host address corresponding to the host name cannot be located.

23. The method of claim 22, further comprising:

if the source is entitled to access the host corresponding to the host address, then providing the address to the source.

24. A machine-readable medium having stored thereon a plurality of instructions for managing access to external hosts by a gateway within a first network, which when executed by a processor, causes the processor to perform operations comprising:

receiving from a source within the first network, a request for a host address outside the first network which corresponds to a host having a host name;

checking whether the source is allowed to access the host corresponding to the host address; and if the source is not allowed to access the host corresponding to the host address, then concealing such lack of privilege from the source by providing an indication to the source that the host address corresponding to the host name cannot be located.

25. An apparatus within a first network to manage access to external hosts comprising:

means for receiving from a source within the first network a request for a host address outside the first network which corresponds to a host having a host name;

means for checking, coupled to the means for receiving, whether the source is allowed to access the host corresponding to the host address; and means for providing, coupled to the means for checking, an indication to the source of the request that the host address which corresponds to the host name cannot be located if the source is not allowed to access the host corresponding to the host address.

* * * * *